April 19, 1955   J. A. LAMPMAN   2,706,309
MEANS OF FORMING PATTERNS AND MOLDS
Original Filed Oct. 8, 1949   2 Sheets-Sheet 1

INVENTOR:
JAMES A. LAMPMAN
BY Herbert E. Metcalf
ATTORNEY

April 19, 1955   J. A. LAMPMAN   2,706,309
MEANS OF FORMING PATTERNS AND MOLDS
Original Filed Oct. 8, 1949   2 Sheets-Sheet 2
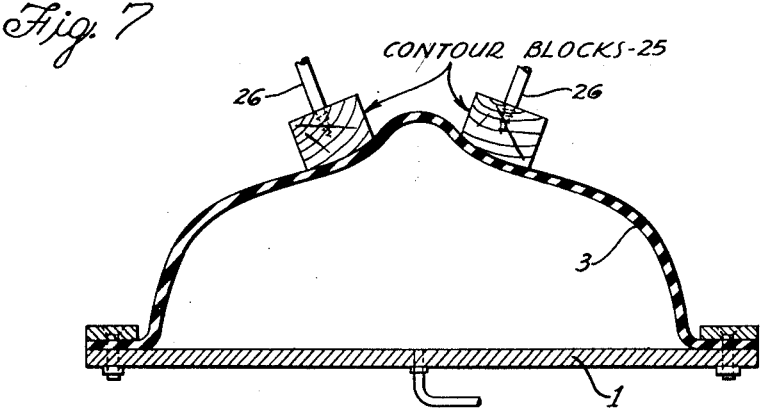
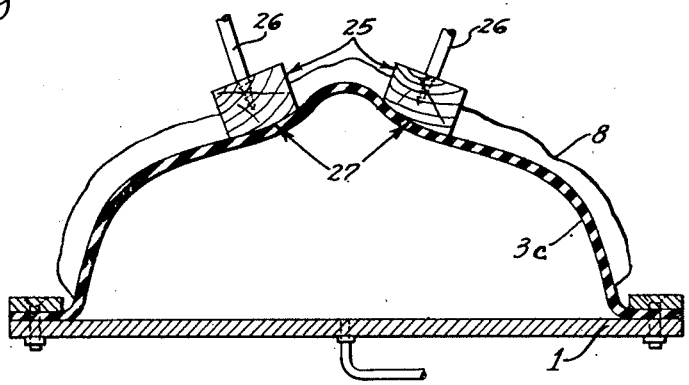
INVENTOR:
JAMES A. LAMPMAN
BY Herbert E. Metcalf
ATTORNEY

United States Patent Office 2,706,309
Patented Apr. 19, 1955

2,706,309

MEANS OF FORMING PATTERNS AND MOLDS

James A. Lampman, Inglewood, Calif., assignor to Northrop Aircraft, Inc., Hawthorne, Calif., a corporation of California Original application October 8, 1949, Serial No. 120,277. Divided and this application March 17, 1952, Serial No. 276,899

3 Claims. (Cl. 18—34)

My invention relates to patterns and more particularly to patterns that are quickly and economically made for the casting of molds having compound curved surfaces, and is a division of my application Serial No. 120,277 now abandoned.

Many plaster molds, for example, are used in the airplane industry, and a large number of such molds have surfaces including compound curvatures. The usual procedure in making a plaster mold having such curved surfaces is to make a series of metal templates representing cross or longitudinal sections at intervals across or along the pattern, set up the templates and then fill in plaster by hand between the templates. Many such patterns, however, are susceptible of duplication by the use of expanded elastic membranes held at the edges thereof, and it is for the production of patterns of this latter type that the present invention is intended.

Among the objects of the invention are:

To provide a novel means of forming a pattern having a compound curved surface;

To provide an economical pattern for molds requiring compound curved surfaces;

And to provide a simple means of molding articles having compound curved surfaces thereon.

Briefly, the present invention involves the use of a flexible and preferably elastic pattern sheet, or membrane. This pattern sheet is fixed and sealed at the edges thereof on and to a foundation member, and fluid pressure is applied to one side or the other of the membrane to expand the elastic membrane into the desired shape. While being held in the desired shape by fluid pressure, moldable time-setting material is applied to the membrane. When this moldable material has set, it is removed, having the contours of the expanded elastic sheet molded therein.

My invention can be more fully understood by reference to the drawings showing, by way of illustration but not limitation, several preferred means for practicing the method of the invention.

In the drawings:

Figure 7 is a sectional view of an expanded membrane having both convex and concave curvatures.

Figure 8 is a sectional view similar to Figure 7 showing the plaster mold formed on the membrane.

Figure 1:
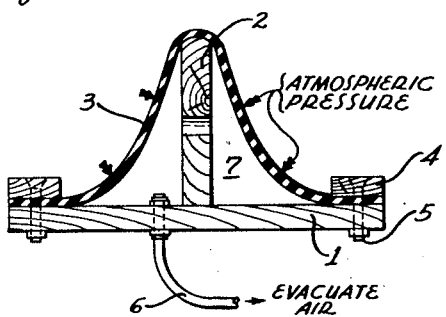
Figure 1 is a diagrammatic cross-sectional view of a pattern formed with both convex and concave curvatures.
Figure 2:
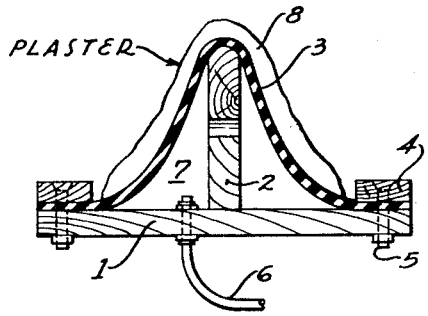
Figure 2 is a diagrammatic cross-sectional view similar to that of Figure 1 showing the application of the molding material to the pattern of Figure 1.

Referring first to Figures 1 and 2, a foundation member 1 such as a metal plate, or a wood sheet as shown, is provided with a central upright support 2 having the desired convex curvature thereon where it contacts a membrane 3. The flexible membrane 3 such as, for example, a sheet of natural rubber or equivalent synthetic elastic material is draped over the central support 2 and then clamped securely and sealed around the edges thereof to foundation member 1 by clamp ring 4 and bolts 5. Foundation member 1 is provided with an exhaust tube 6 opening into the space 7 between the membrane 3 and the foundation member 1.

The interior space 7 is then exhausted to cause atmospheric pressure to expand the sides of the membrane inwardly into a desired compound curvature, as shown in Figure 1. A layer of time-setting moldable material 8 such as, for example, a relatively thin coating of wet plaster, is then placed over the membrane 3 as shown in Figure 2. When hardened, the plaster is removed and preferably backed, to form a mold in which replicas of the pattern shape may be cast. The surface of membrane 3 to which the moldable material is applied is greased, soaped, or otherwise treated to provide ready separation of the set plastic material.

In this manner, convex and concave compound curves may be readily formed on a pattern, the curvatures being under control, first, of the edge contour of the membrane, second, of the central support, and third, of the differential pressure on the membrane 3.

Figure 3:
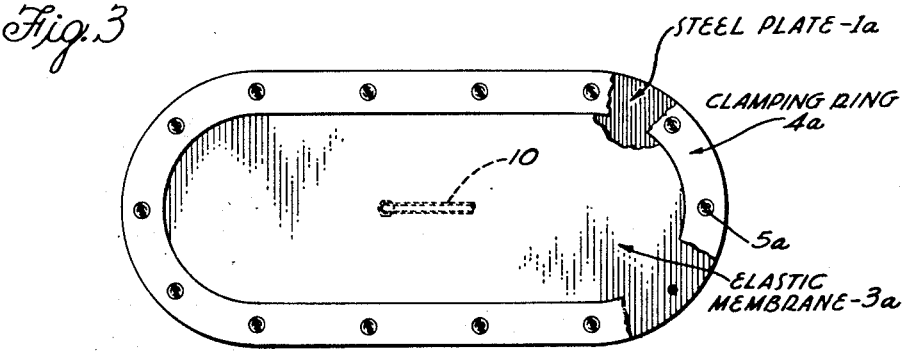
Figure 3 is a plan view of a compound curve pattern before expansion.
Figure 4:
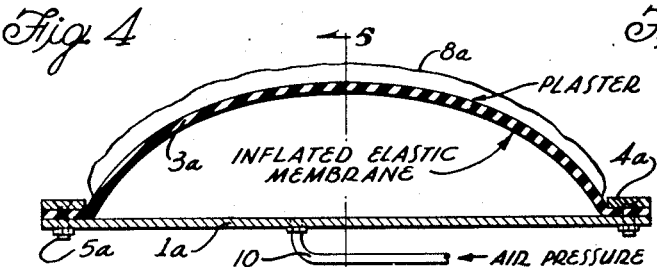
Figure 4 is a longitudinal sectional view of the pattern of Figure 3 in expanded condition and with the molding material applied thereto.
Figure 5:
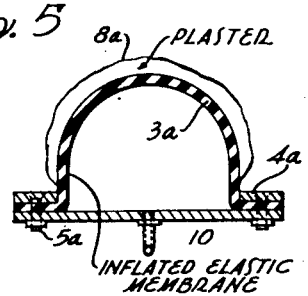
Figure 5 is a cross-sectional view taken as indicated by the line 5—5 in Figure 4.

For convex curvatures, the device shown in Figures 3, 4, and 5, is preferably used.

Here, the foundation member 1a is preferably of metal, having a flat elastic membrane 3a clamped thereto by clamping ring 4a and bolts 5a. A pressure line 10 is attached to foundation member 1a so that air, or other fluid under pressure, such as water or oil, can be applied to the interior surface of the membrane 3a.

Air under pressure, for example, is then supplied through pressure line 10 to expand the membrane 3a into free space by a desired amount. Wet plaster 8a is then applied as before to the exterior surface of the membrane. When set, the plaster is removed and backed for use as a mold, for example, as in the device of Figures 1 and 2.

Figure 6:
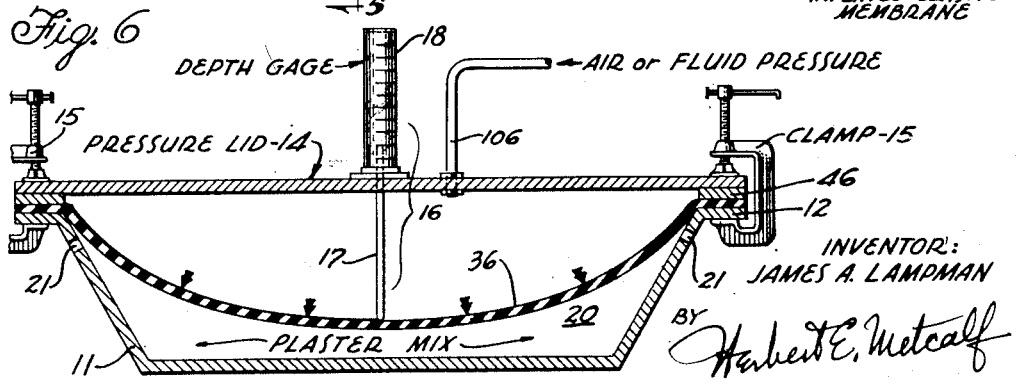
Figure 6 is a sectional view of an elastic pattern forming member expanded into a fluid plaster mix.

A modification of the process is shown in Figure 6. Here, the foundation member is in the form of a container 11, and membrane 3b is clamped between the edges 12 of the container 11 and a container lid 14 through clamping ring 4b as by C clamps 15. Lid 14 is provided with a pressure inlet 10b and also a depth gage 16 consisting of a vertical rod 17 sliding inside of a closed, indexed, transparent gage tube 18.

In operation, container 11 is partially filled with a quantity of wet plaster mix 20. Pressure is applied to the pressure inlet 10b to force the elastic membrane 3b into the mix, forcing this mix to cover the membrane 3b. Drain holes 21 may be provided near the top of the container 11 to drain off any excess plaster mix from the container. The proper position of the membrane 3b can be determined by looking at rod 17 through the transparent tube 18. After the proper depth has been reached by the membrane, the pressure on the membrane is maintained until the plaster mix in the container has set. Pressure is then removed, the membrane and lid are unclamped and removed to leave the impression of expanded membrane 3b in the hardened plaster within the container 11.

Another way by which combined convex and concave curvatures can be formed in the pattern is shown in Figures 7 and 8, for example. Here, the elastic membrane 3 is clamped as before described to foundation member 1, and expanded into space until the membrane contacts one or more contour blocks 25 positioned in space as by support rods 26. A concave curvature as desired is imparted to the membrane 3 as determined by the contour of the membrane contacting surfaces 27 of the contour blocks 25. The plaster mix 8 is then applied over the membrane and the blocks 25 to provide the desired mold.

The invention as described above has utilized plaster as the mold material. However, it is to be distinctly understood that other time-setting materials can be equally well utilized to form the mold, such materials including, for example, sprayed metal, resin impregnated glass fabric, or any other material that can be formed to fit the expanded membrane, and later solidified by heat, light or chemical action to form a mold facing that will retain the shape of the expanded membrane.

Thus, while in order to comply with the statute, the invention has been described in language more or less specific as to structural features, it is to be understood that the invention is not limited to the specific features shown, but that the means, construction, and method herein disclosed comprise the preferred form of several modes of putting the invention into effect, and the invention is, therefore, claimed in any of its forms or modifications within the legitimate and valid scope of the appended claims.

What is claimed is:

1. A mold-forming device comprising: an impermeable foundation member; a sheet of flexible impermeable material positioned above said member and detachably clamped around its peripheral edge to said member to define therewith a fluid-tight chamber; means defining a contour surface fixedly spaced from said member and engageable by a limited portion of the surface of said sheet; and means for effecting a differential pressure between said chamber and the exterior thereof to force said sheet into engagement with said contour surface and shape said sheet to a predetermined contour presenting a generally upwardly-facing, substantially entirely exposed exterior surface for supporting a mold-forming layer of settable material.

2. The structure defined in claim 1, in which the contour surface means is disposed inside the chamber and the pressure-effecting means creates a lesser pressure within said chamber.

3. The structure defined in claim 1, in which the contour surface means is disposed outside the chamber and the pressure-effecting means creates a greater pressure within said chamber.

References Cited in the file of this patent

UNITED STATES PATENTS

| | | |
|---|---|---|
| 1,487,178 | Polleys | Mar. 18, 1924 |
| 2,281,133 | Abercrombie | Apr. 28, 1942 |
| 2,367,779 | Hull | Jan. 23, 1945 |